Aug. 18, 1942. R. CHILTON ET AL 2,293,279
AIRCRAFT TRANSMISSION
Filed Sept. 10, 1938 3 Sheets-Sheet 3
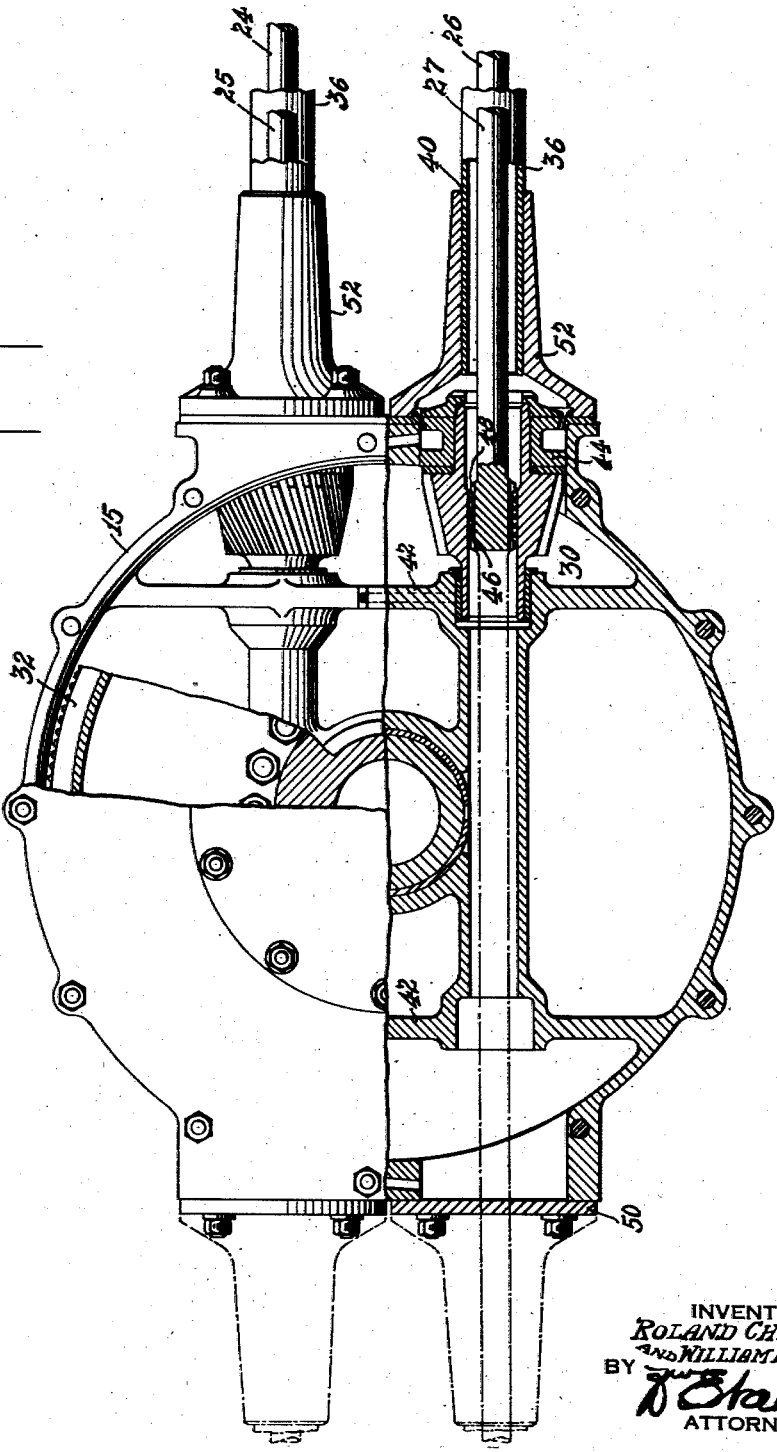
INVENTORS
ROLAND CHILTON
AND WILLIAM M. SIESEL
BY
ATTORNEY Patented Aug. 18, 1942

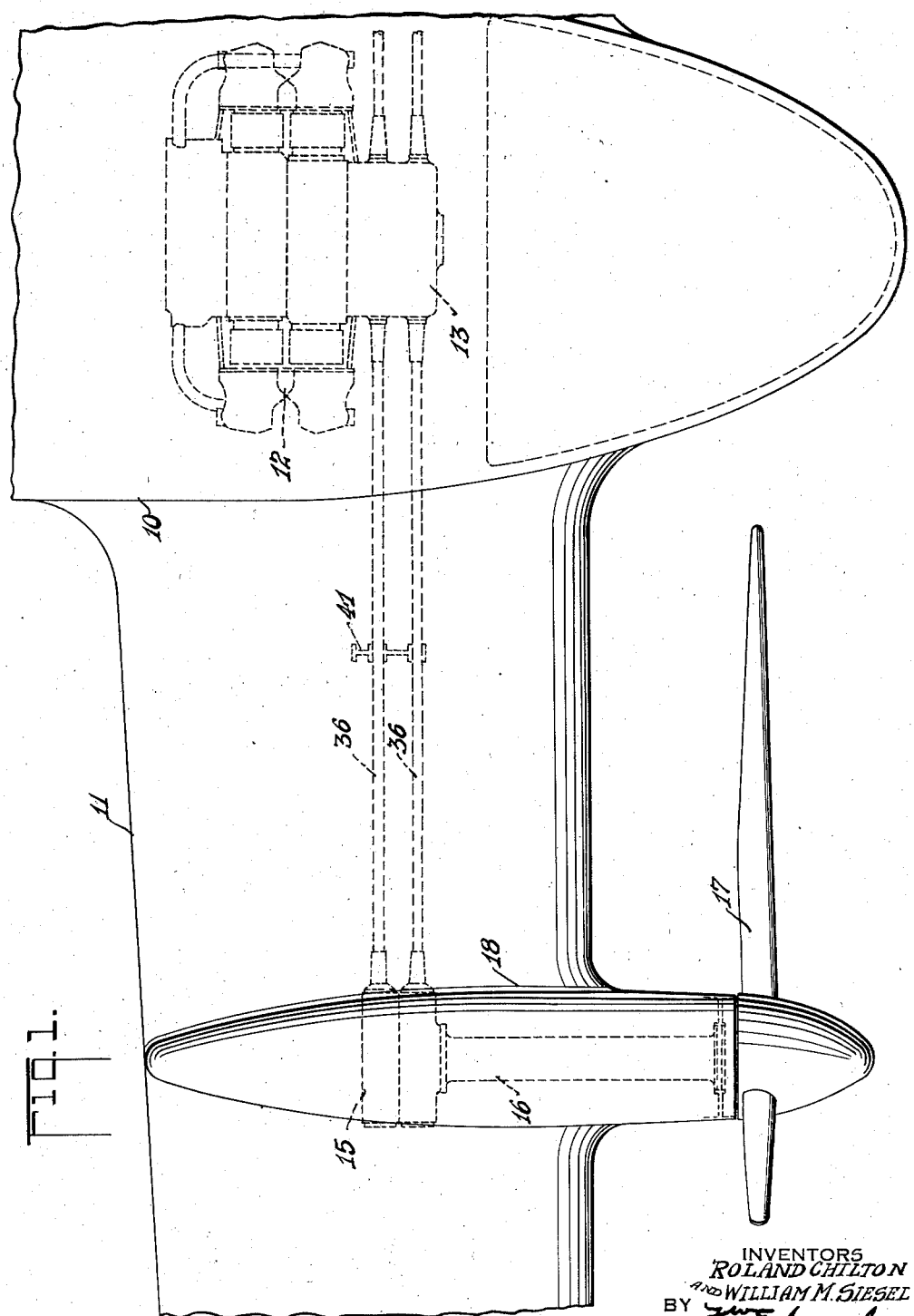

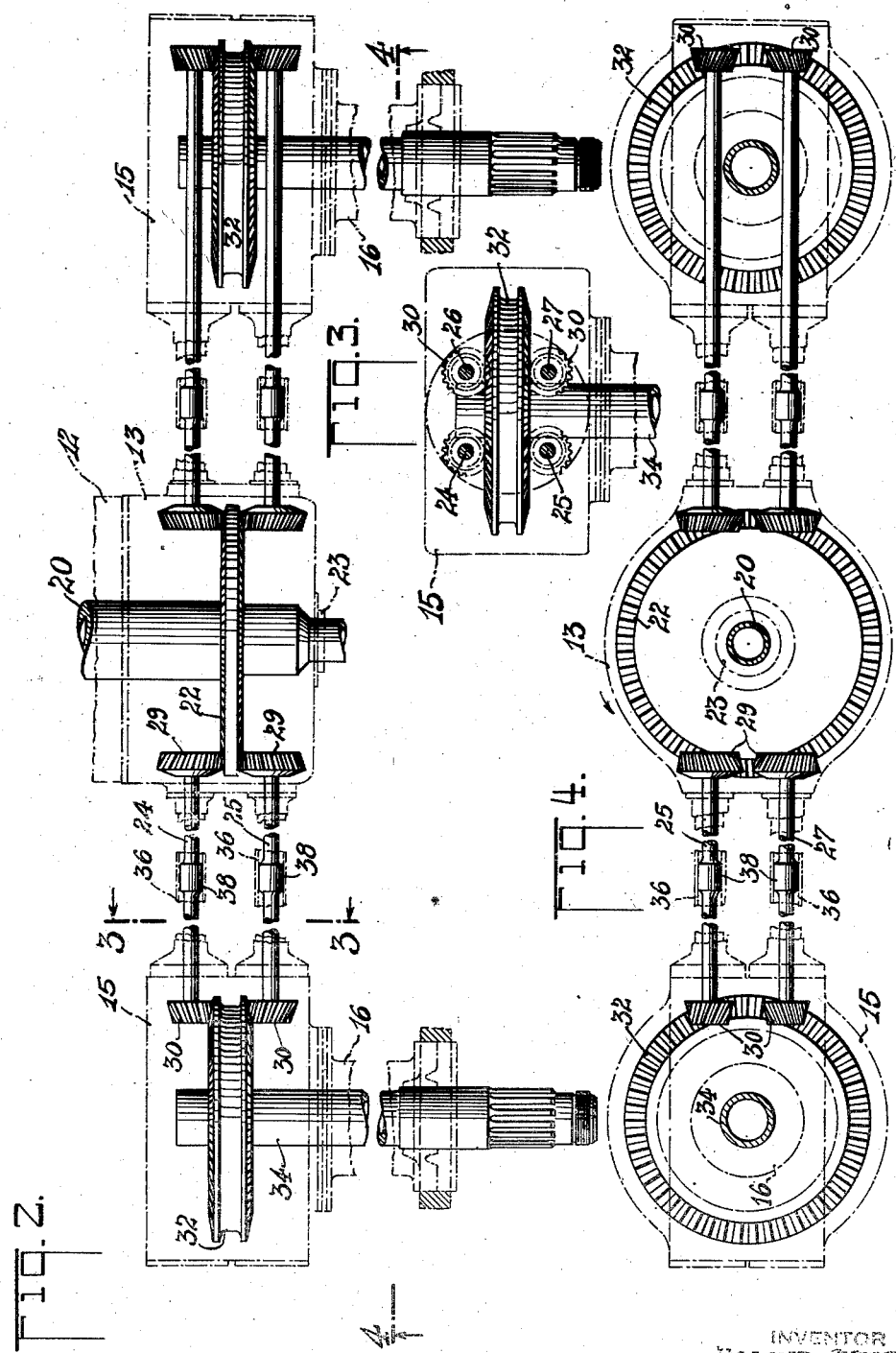

2,293,279

UNITED STATES PATENT OFFICE 2,293,279

AIRCRAFT TRANSMISSION

Roland Chilton, Ridgewood, and William M. Siesel, Verona, N. J., assignors to Wright Aeronautical Corporation, a corporation of New York Application September 10, 1938, Serial No. 229,286

5 Claims. (Cl. 244—60)

This invention relates to gear and shaft transmission systems in general, the specific embodiment of drawings being designed to drive propellers on the wings of an airplane from an engine mounted in the hull or fuselage. In conventional multi-propeller airplanes, the engines are mounted in nacelles on the wings with directly attached propellers, and such nacelles constitute elements of parasite drag and detract from the lift of the wing under high angle of attack conditions. Accordingly, it is often desired to submerge the engines in the hull or fuselage. The propeller tips must clear the sides of the fuselage which involves relatively long transmission shafts where the engine is placed therein.

The obvious layout consists of a bevel gear on the engine power shaft, engaging a pinion which drives a lateral shaft engaging an outboard pinion meshed with a bevel gear on the propeller shaft, and the power is thus transmitted in series through two pairs of gears each transmitting the full load. Attempts to design such a single-contact bevel gear system result in driving gears of larger diameter than the engine crankcase and requiring abnormally wide gears which are objectionable both as to weight and in the difficulty of obtaining uniform contact throughout the great length of tooth involved. In the case of bevel gears, tooth widths of more than a quarter of the radius of the gear are of little avail since the pitch cone diameters at the inner end become too small. The present invention teaches the use of mutiple pinions and shafts engaging common gears on the engine and propeller shaft respectively. This is achieved by either or both of two expedients:

(a) Hypoid pinions are used having their centers offset above and below the driving gears, permitting the use of upper and lower pinions and shafts;

(b) The bevel gears are made double-faced and pinions are engaged with both the front and back of the gears whereby a propeller may be driven through four pinions and shafts in parallel whereby the load at each tooth contact is reduced to one-quarter of that in the conventional arrangement.

Further, for the case of twin propellers and a single central engine, this quadruple arrangement may be used at both sides of the engine gear and, accordingly, the engine driving loads are sub-divided over eight tooth contacts.

A further feature of the invention follows from the use of high speed shafts whereby the pinion diameters are relatively small, reducing the weight of the pinions and the bulk of the housings and also moderating the hypoid offset dimension. In the case illustrated, the proportions are calculated for a 2000 H. P. engine, giving only 250 H. P. per pinion and shaft. The pinions and shafts run at four times engine speed in the instant case so that the torque on each shaft becomes $\frac{1}{8} \times \frac{1}{4} = \frac{1}{32}$ of engine torque, whereby the shafts may be made of extremely small diameter as compared to the conventional case where the torque on the shaft is of the order of engine torque requiring large diameter tubular shafts.

Such rigid shafts of the prior art introduce additional complication and weight in requiring universal joints to allow for wing deflection. According to the present invention, the diameter of the shaft is so insignificant compared to the depth of the wing spar that universal joints are omitted and the shafts permitted to deflect by their own inherent lateral elasticity without significant stress increase. Such slender shafts as here contemplated would be subject to "whirling" at certain critical speeds if left unsupported. According to this invention, however, the shafts are enclosed in slender tubes in which steady bearings for the shaft are provided at appropriate intervals. The tube attachments to the engine and propeller gear housings are relatively rigid so that the deflections are confined to the mid-portion of the tubes and shafts and therefore do not tend to misalign the ends of the shafts relative to the pinions which they engage.

Other objects and advantages of the invention will be obvious from, or will be pointed out in the following description with reference to the drawings, in which:

Fig. 1 is a plan of a portion of an aircraft fuselage and wing showing the provisions of the invention in dotted lines;

Fig. 2 is a plan of the transmission organization;

Fig. 3 is a section on the line 3—3 of Fig. 2;

Fig. 4 is a front elevation of the gear organization comprising a section on the line 4—4 of Fig. 2, and Fig. 5 is a front elevation, shown partly in section and partly with the front cover removed, of a part of the transmission system.

Referring first to Fig. 1, 10 designates an aircraft fuselage having a wing 11 extending therefrom, the fuselage carrying a submerged power plant 12 having a front gear housing 13. From said housing a plurality of transmission shaft housings extend laterally through the wing, terminating in a transmission unit 15 having a forwardly extending housing 16 through which passes a propeller shaft upon which a propeller 17 is mounted. The units 15 and 16 are provided with streamlined fairing indicated at 18, and it will be noted that the cross-sectional area of the fairing 18 will be very small as compared with the frontal area of the power plant 12. By the provisions of the invention, the large power plant 12 is wholly submerged within the fuselage in contradistinction to conventional practice in which engines are carried in wing nacelles, these nacelles having a substantial drag. By the elimination of the large wing nacelles and the substitution therefor of small fairings extending rearwardly from the propellers, a gain in aerodynamic cleaness in the airplane is afforded.

As above noted in the introductory remarks, a conventional bevel gear and shaft arrangement is unsatisfactory in an installation of this kind on account of the large parts which would be necessary and the high gear tooth loads which would be encountered. Reference may be now made to Figs. 2 to 5 inclusive which show the improved transmission mechanism of the invention. 20 represents the power shaft of the power plant 12, upon which a double-faced spur toothed bevel gear 22 is mounted, the shaft 20 being piloted at its forward end in a bearing 23 carried by the housing 13. On each side of the housing 13, laterally extending rectilinearly disposed shafts 24, 25, 26 and 27 are journalled each of these shafts carrying at its inboard end a hypoid bevel pinion 29 engaged with one of the faces of the bevel gear 22. The bevel gear teeth are of the spur type, whereas the teeth of the pinions 29 are skewed to properly engage the gear teeth above and below the gear center. The outer ends of the shafts 24, 25, 26, and 27 drive pinions 30 engaged with a double-faced spur bevel gear 32 mounted on a propeller shaft 34, the latter being borne in and extending forwardly through the housing 16 to carry the propeller 17. The gears 30 and 32 are borne within the casing 15.

The several shafts 24, 25, 26, and 27 may be of quite small diameter since each, in an installation such as shown which has eight shafts, transmits one-eighth of the engine power. Due to the step-up gearing from the gear 22 to the pinions 29, the rotational speed of the shafts 24 to 27 is high and the torque is correspondingly lessened for the power transmitted. Thus, these shafts are light in weight and, may be quite flexible obviating the necessity of universal joints therein and allowing for deflections of the wing 11 with respect to the fuselage 10 under flight loads. To hold the shafts 24 to 27 from undue radial excursions, individual shaft housings 36 embrace each, and one or more steady bearings 38 may be provided between the shafts and housings to hold the latter elements in concentric relationship. The housings 36 may likewise be sufficiently flexible to allow for load deflection, but will be sufficiently stiff to hold their contained shafts for true running. The shaft housings 36 are coupled to the casings 13 and 15 by telescoping joints as shown in Fig. 5 at 40, and may have intermediate supports as at 41 in Fig. 1.

In Fig. 5 the detailed construction of one of the casings 15 and its contained gearing is shown. Inboard bearing carriers 42 are provided and bearings 44 are carried by the casing itself, in which the pinions 30 are journalled, said pinions being hollow and being provided with internal splines 46 engaged by the splined end 48 of one or the other of the shafts 24 to 27. It will be noted that the bearing bores in the casing 15 and in the members 42 are symmetrical on each side of the casing center so that the pinions 30 may be alternately disposed on one or the other side of the center of the gear 32. Thus, casings 15 disposed on opposite sides of the power plant may be arranged as indicated in Fig. 2 for driving the outboard propellers of the aircraft in opposite directions by which propeller torque is cancelled out. For instance, in Fig. 4, assuming anti-clockwise rotation of the driving gear 22, the left-hand gear 32 is driven in a clockwise direction due to the engagement of the pinions 30 with the inboard side of the gear. On the right-hand side as shown, the high speed drive shafts extend to the outboard sides of the right-hand gear 32 by which anti-clockwise rotation of the right-hand gear 32 and its propeller is obtained. Again referring to Fig. 5, the pinions 30 may be disposed with equal facility on either the right or left-hand sides of the casing 15 and the high speed shafts 24 to 27 inclusive may be arranged to pass through the casing as shown in dot and dash lines, or may be arranged to pass into the casing for driving of the gear 32.

That side of the casing 15 from which the drive shaft and housings do not project may be closed by cover plates 50, while that side from which the shafts project receive the housing terminals 52 into which the housings 36 are telescoped.

In an installation of this character the thickness of the wing 11 would approximate the diameter of the casing 15, and it will be seen that any operating deflection to which wing spars may be subjected will induce insignificant bending stresses in the long slender tubes 36 and shafts 24 to 27. It will be understood that the propeller gear housings 15 are secured to wing structure and that, in view of the flexibility of shafts and housings, this securement may be rigid.

The gear organization shown may be constructed as a propeller reduction gear as well as means for transmitting power from an engine to remote propellers, merely by selecting the proper ratios of gears in the housing 13 and in the housings 15. The power of a single engine is transmitted to two propellers through eight shafts and pinions, thereby reducing the tooth loads on the propeller driving pinions to one-fourth of that in a conventional geared propeller drive. Further, if the pinions be organized for four times engine speed as shown, the torque on each, and on each extension shaft, will be one-thirty second of engine torque by which the shafts may be made very slender. It will be noted that, in the helical pinions 29 and 30, diagonally opposite pinions on one side of the gear will be identical so that, in the casing 13, there are but two different forms of pinions and similarly in each casing 15 there are but two different forms of pinions.

The showing indicates a two propeller drive from a single engine but it is apparent that the principles of the invention may be used for driving one propeller from a single engine or conversely, driving a greater number than two propellers from a single engine. The provisions of the invention likewise point to the possibility of coupling a plurality of propellers and engines together by light weight transmission means if such a coupling should be deemed desirable.

While we have described our invention in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In combination in aircraft comprising a central engine and propellers spaced laterally therefrom, a pair of spaced propeller shafts having bevel gears, pinions respectively meshed with the inside run of one of said gears and with the outside run of the other, a power bevel gear between said shafts and driven by the engine, pinions engaged with respective sides of said gear, and a lateral shaft drivably connecting each power gear pinion with the respective propeller gear pinion.

2. In combination with an airplane having spaced apart propeller gear housings in wings subject to relative deflection and an engine gear housing therebetween in a central body, lateral shafts between said body and wing housings, tubes surrounding said shafts, and rigid means connecting the ends of said tubes to respective housings against local deflection, said tubes and shafts being flexible intermediate their ends to allow for deflection thereof upon deflection of the wings relative to the body.

3. In combination in aircraft, engine and propeller housings each containing gears and mounted in relatively deflectable structures, lateral shafts connecting said gears, and lateral tubes housing said shafts and connecting said housings, the tube-to-housing connection being laterally rigid but the tubes and shafts being sufficiently flexible intermediate said connections to yield to slight relative displacement of the respective housings and structures such as that incident to the deflection of the wings of the airplane in which the housings are installed.

4. In an aircraft comprising a body and wings, in combination, an input gear box in the body, a long, slender integral intermediate shaft extending therefrom through the wing, an output gear box in the wing driven by said shaft, said boxes being subject to relative deflection in service due to wing loading, means on said boxes securing the respective ends of said shaft for alined operation thereat, and intermediate steady bearings along said shaft secured to the wing structure and deflectable with and with respect to said boxes.

5. In an aircraft comprising a body and wings, in combination, an input gear box in the body, a long, slender integral intermediate shaft extending therefrom through the wing, an output gear box in the wing driven by said shaft, said boxes being subject to relative deflection in service due to wing loading, means on said boxes securing the respective ends of said shaft for alined operation thereat, and a guide tube embracing said shaft and joining said boxes having steady bearings therealong secured to the wing structure and engaging said shaft, said tube being of sufficient resilience to allow of the relative deflection of said boxes.

ROLAND CHILTON.
WILLIAM M. SIESEL.